May 26, 1936. R. N. TORP 2,042,200
REMOVABLE TOOTH MOUNTING FOR DENTAL MODELS
Filed May 1, 1934
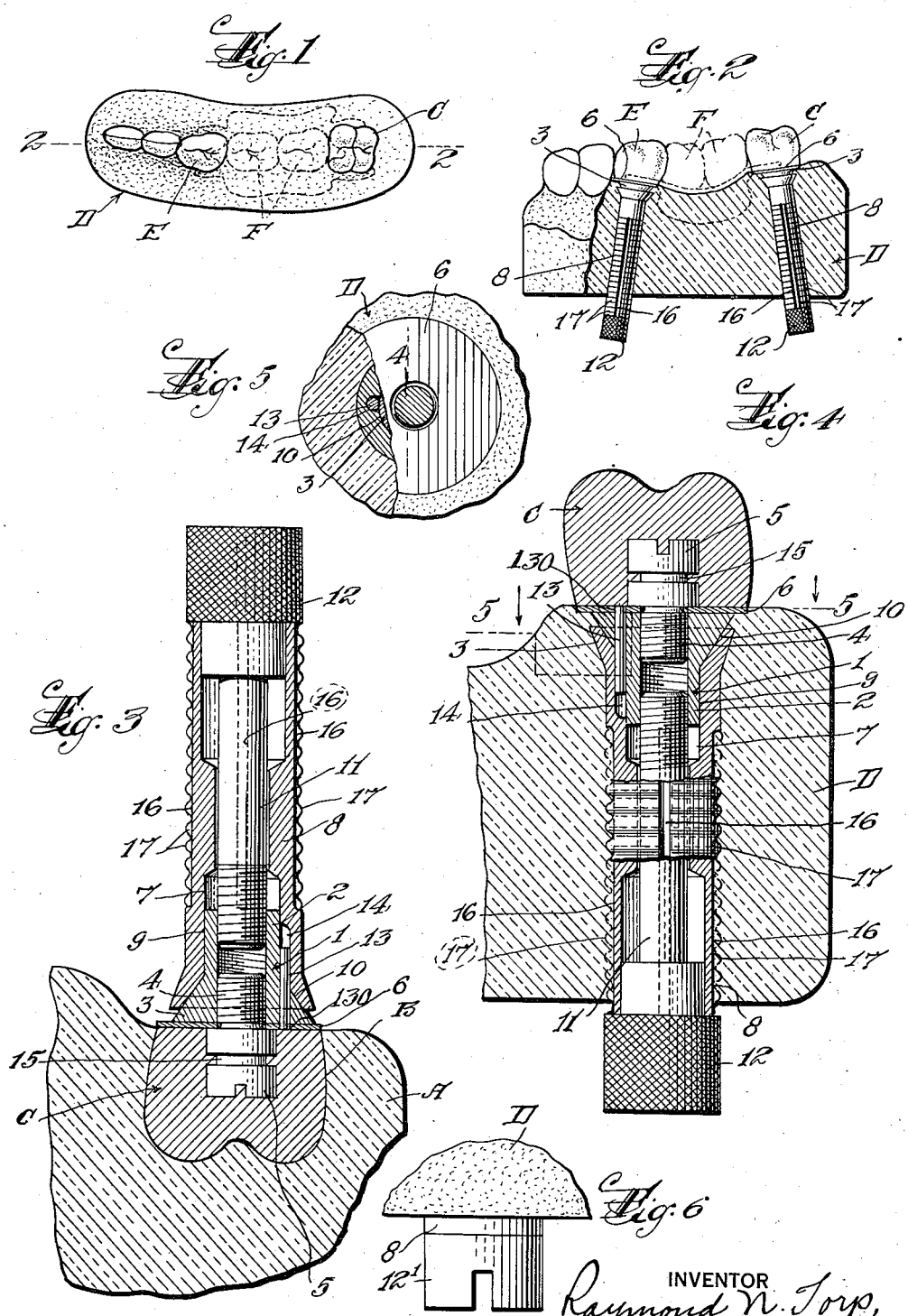
INVENTOR
Raymond N. Torp,
BY Harry S. Rook,
ATTORNEY Patented May 26, 1936

2,042,200

UNITED STATES PATENT OFFICE 2,042,200

REMOVABLE TOOTH MOUNTING FOR DENTAL MODELS

Raymond Nelson Torp, Union, N. J.

Application May 1, 1934, Serial No. 723,342

6 Claims. (Cl. 32—40)

In the making of dentures, plates, bridges, inlays, crowns and the like it is the general practice to make a mechanical duplicate or model of the portion of the natural jaw to which the denture is to be applied. Bridges and the like are generally attached to permanent teeth in the anatomical jaw, and in constructing and fitting dentures to be attached to such teeth it is necessary that the mechanical model include duplicates of these permanent teeth. To facilitate fitting of the dentures to the duplicates of the permanent teeth on a model, it has been common practice to removably attach such permanent teeth to the model, and my invention is directed particularly to a novel and improved means for removably mounting the teeth on the model.

Known devices of this general character are difficult to use and require painstaking and tedious operations as well as the use of complicated apparatus, such as parallelometers, for properly locating the tooth models in a mechanical model of a portion of the jaw.

Therefore, one object of my invention is to provide a removable mounting for the teeth of dental models whereby the teeth may be mounted in a model easily and quickly and without the necessity for any special care in paralleling the mounting of the teeth.

Another object is to provide such a removable tooth mounting whereby only slight movement of the tooth relative to the model shall be required for completely separating the tooth from the model and the teeth and a wax model of a denture or the denture itself can be removed together at the same time so that any overhanging or binding relation between the duplicates of the permanent teeth and the teeth of the denture being fitted to the model, will not interfere with removal of the denture from the model and during such removal all likelihood of distorting or damaging of the denture may be avoided.

Other objects are to provide such a removable tooth mounting embodying novel and improved features of construction whereby a tooth can be applied to and removed from the model repeatedly and the tooth can be surely replaced upon the model each time in its proper position so as to facilitate fitting of a denture thereto, whereby there shall be no danger of misfitting of the denture due to change in position of the tooth during removal and replacement thereof; to provide a removable tooth mounting of this character which shall comprise a novel and improved construction and combination of a mounting tube to be embedded in a plaster model having a shallow seat at the top of the model, a saddle or head for the tooth, and means for removably fastening the saddle in said seat of the mounting tube; and to obtain other advantages and results as will be brought out by the following description.

Referring to the accompanying drawing in which corresponding and like parts are designated throughout the several views by the same reference characters, Figure 1 is a top plan view of a dental model embodying a removable tooth mounting constructed in accordance with my invention.

Figure 2 is a combined longitudinal vertical section and side elevation of the model taken on the line 2—2 of Figure 1.

Figure 3 is an enlarged vertical sectional view through the mounting showing the manner of attaching it to a tooth.

Figure 4 is a similar view showing the mounting and tooth secured in a plaster model.

Figure 5 is a horizontal sectional view on the line 5—5 of Figure 4, and

Figure 6 is a fragmentary side elevation of a modification of the screw for holding the tooth saddle in the mounting tube.

Specifically describing the illustrated embodiment of the invention, the reference character A designates a cast of plaster or other suitable material which has been produced directly from the portion of the anatomical jaw for which a denture is to be constructed, and which contains a cavity B formed by a tooth of the jaw to which a denture is to be attached. To obtain a duplicate of the natural tooth for use in a dental model, the cavity is filled with molten metal and while the metal is still soft my removable mounting is connected thereto.

This removable mounting comprises a saddle 1 which has a cylindrical tubular shank 2 and a frusto-conical head 3. Within the saddle is fitted a screw 4, and clamped between the head 5 of the screw and the head 3 of the saddle is a thin metal plate 6 which is preferably of approximately the same area as the exposed end of the metal tooth model C in the cavity B. The saddle 1 is fitted into a recess 7 formed coaxially in a mounting tube 8 and opening through one end of the tube. This recess has a portion 9 to nicely receive the shank 2 of the saddle and a frusto-conical or flared shallow seat 10 to nicely fit the head 3 of the saddle. The saddle is held in the mounting tube by a screw 11 threaded into the end of the shank 2 of the saddle and having a head 12 abutting the other end of the mounting tube, and for preventing relative rotation of the saddle and the mounting tube the saddle may have a lug 13 to snugly fit a groove 14 in the side of the recess 7. Preferably the lug 13 is a pin and the pin projects above the head of the saddle and through an opening 130 in the plate 6 to prevent relative rotation of the plate 6 and saddle.

Before the metal of the tooth model C hardens the head 5 of the screw 4 is pushed into the metal so as to be embedded therein, with the plate 6 abutting the exposed end of the tooth model at approximately the surface of the plaster cast A; and for providing a secure bond of the screw in the metal, the screw may have a circumferential groove 15 or other suitable roughening of its surface. After the metal of the tooth model C has hardened, a final model of the portion of the jaw containing the tooth of which the model C is a duplicate, is formed by building up plaster or other suitable material around the mounting tube 8 as shown in Figure 4. To prevent movement of the mounting tube in the plaster, the exterior of the mounting tube can be roughened for example by providing longitudinal grooves 16 and circumferential grooves 17. The plaster cast A can then be broken away from the tooth model C and the operating or fitting model or instrument D with the removable tooth mounting therein can then be used for fitting the denture which is to be made. Generally there will be two or more permanent teeth of the natural jaw to be represented on the operating model D, and it will be understood that removable mountings for the other teeth will be produced in the same way as that above described.

In Figures 1 and 2 is shown an additional tooth E and corresponding mounting.

It will be observed that in the operating model the artificial teeth C and E will project from one side of the model while the screw heads 12 will project from the other side, and that by simply detaching the screws 11 from the saddles 2, the respective teeth C and E can be removed from the model. The saddles 3 are substantially shorter than the mounting tube, and it will be seen that during application and removal of the teeth to and from the mounting tubes, only slight angular and longitudinal movement and no rotation of the teeth or saddles is necessary due to the short saddles 2 and the fastening thereof in the ends of the mounting tubes adjacent the top of the model by the screws 11 that are operable from the bottom of the model independently of the teeth.

This structure is therefore especially advantageous in that it is immaterial whether the mounting tubes 8 of the two teeth are in parallel relation to each other; in fact, they may be considerably out of parallel relation as shown in Figure 2, and therefore no painstaking and tedious operations are necessary for securing the mountings in the model. The structure is further advantageous in that where there is an overhanging or binding relation between the tooth model C and E and the teeth F of a denture being fitted to the model, the denture and the teeth C and E can be removed together so that there is no possibility of distorting or straining a wax model of the denture or the denture itself upon application and removal of the wax model or denture to or from the operating model D during fitting of the denture.

After the denture and teeth C and E have been removed from the model together it is easy to separately remove the teeth from the denture. Also, the teeth can be removed from and replaced on the model easily, quickly and repeatedly, and the lug 13 and groove 14 serve to locate the tooth in the mounting so as to insure that the tooth shall be placed in the same position on the model each time, whereby possibility of misfitting of the denture is reduced.

Preferably, the head of the screw 11 is elongated and knurled for convenience in manipulating but where the model is to be used in an articulator the long projecting head may be a hindrance, in which case a shorter head 19 with a kerf 20 can be used as shown in Figure 6. Plates 6 of different sizes can be used to accommodate teeth of different sizes, or a plurality of teeth.

While I have shown and described the invention specifically in connection with the making and fitting of a bridge, it should be understood that the invention is also susceptible to use in the making of inlays, crowns, and porcelain jackets, for example in holding the dies, and may also be utilized wherever it is desired to removably mount a tooth or a part of a denture on a model.

It will also be observed that by removing the tooth and the screw 11 from the mounting and then connecting the screw to the saddle 2, the screw will serve as a handle for holding or manipulating the tooth or a die or other part that may be attached to the saddle. Also, the specific details of construction of the mounting can be modified and changed by those skilled in the art without departing from the spirit or scope of the invention.

Having thus described my invention, what I claim is:

1. A mounting for a tooth model or similar article, comprising a tube to be embedded in a plaster model and having a frusto-conical seat in one end thereof, a saddle having a frusto-conical portion to fit said seat, said saddle being formed outwardly of said portion for attachment to a tooth or similar article, and a screw passing through said tube having a threaded connection at one end with said saddle and having a head at its other end abutting the adjacent end of the tube opposite said saddle for fastening said saddle in said tube.

2. A mounting for a tooth model or similar article, comprising a tube to be embedded in a plaster model and having a frusto-conical seat in one end thereof, a saddle having a frusto-conical portion to fit said seat, said saddle having a screw in its end outwardly of said portion with a head to be embedded in a tooth or similar article, a plate clamped between said head of the screw and said end of the saddle, and means for fastening said saddle in said tube.

3. A dental instrument comprising a body, a shallow seat in said body adjacent the top thereof, a saddle to fit at one end in said seat and having a tooth attached to its other end, said saddle and seat having cooperating portions for locating said saddle in predetermined position in the seat, and a screw passing through said body having a threaded connection at one end with said saddle and having a head at its other end abutting the bottom of said body.

4. A dental instrument comprising a body having an opening therethrough and a shallow seat at one end of said opening, a saddle to fit at one end in said seat and having a tooth attached to its other end, said saddle being substantially shorter than said opening, and a screw passing through said opening and having a threaded connection at one end with said saddle and having a head at its other end abutting said body at the end of said opening opposite said saddle for separably fastening said saddle in said seat.

5. A mounting for a tooth model or similar article comprising a tube to be embedded in a plaster model, a saddle fitted at one end into one end of said tube and formed at its other end for attachment to a tooth or similar article, and means separably connected to the saddle and passing through said tube and operable from the end thereof opposite said saddle for fastening said saddle in said tube, said saddle and said tube having cooperating interlocking portions to locate the saddle in the tube and to prevent relative rotation of the saddle and tube.

6. A mounting for a tooth model or similar article comprising a tube to be embedded in a plaster model, a saddle fitted at one end into one end of said tube and formed at its other end for attachment to a tooth or similar article, and means separably connected to the saddle and passing through said tube and operable from the end thereof opposite said saddle for fastening said saddle in said tube, said tube having an interior longitudinal grooove and said saddle having a lug to fit said groove to locate said saddle in the tube and prevent relative rotation of said saddle and tube.

RAYMOND N. TORP.